United States Patent [19]

Rasmussen

[11] E Re. 30,254

[45] Reissued Apr. 8, 1980

[54] THERMAL INSULATING CURTAIN, ESPECIALLY FOR USE IN GREENHOUSES

[75] Inventor: Max O. H. Rasmussen, Gadstrup, Denmark

[73] Assignee: Heikki S. Suominen, Tampere, Finland

[21] Appl. No.: 884,774

[22] Filed: Mar. 8, 1978

[30] Foreign Application Priority Data

Apr. 29, 1974 [DK] Denmark ..... 2346/74

Related U.S. Patent Documents

Reissue of:

[64] Patent No.: 4,019,554
Issued: Apr. 26, 1977
Appl. No.: 571,486
Filed: Apr. 25, 1975

[51] Int. Cl.[2] ..... E06B 3/94

[52] U.S. Cl. ..... 160/84 R; 160/120; 160/166 R

[58] Field of Search ..... 160/332, 84 R, 119, 160/238, 109, 113, 120, 121, 166 R

[56] References Cited

U.S. PATENT DOCUMENTS

| | | | |
|---|---|---|---|
| 1,827,718 | 10/1931 | Whitney | 160/84 R |
| 1,937,342 | 11/1933 | Higbie | 160/84 R UX |
| 2,874,612 | 2/1959 | Luboshez | 160/84 R X |

FOREIGN PATENT DOCUMENTS 549831 12/1957 Canada .

*Primary Examiner*—Philip C. Kannan
*Attorney, Agent, or Firm*—Pollock, Vande Sande & Priddy

[57] ABSTRACT

A thermal insulating curtain, especially for use in greenhouses, which comprises a plurality of superimposed uni-directionally arranged tubular members with a common slat-like partition between each two adjacent ones of said tubular members. Each of these tubular members along its two opposite sides has a folding crease to allow collapsing said tubular members to thereby permit collapsing the entire curtain in a manner of a blind or to roll the curtain up in the manner of a shade.

10 Claims, 4 Drawing Figures

THERMAL INSULATING CURTAIN, ESPECIALLY FOR USE IN GREENHOUSES

Figure 1:
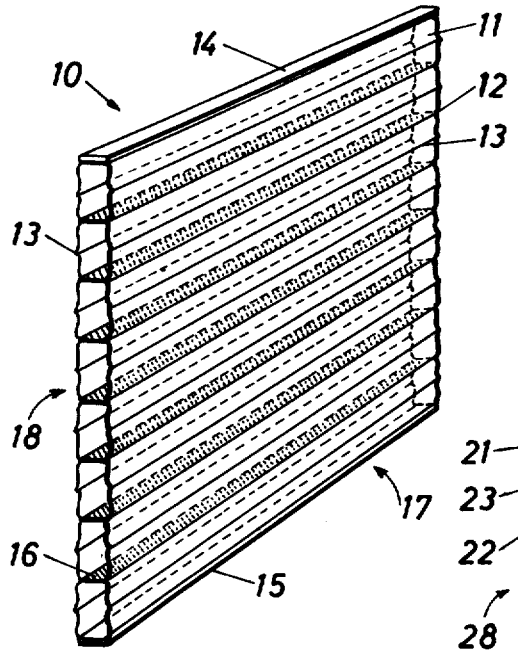

Matter enclosed in heavy brackets [ ] appears in the original patent but forms no part of this reissue specification; matter printed in italics indicates the additions made by reissue.

The invention relates to a thermal insulating curtain, mainly for use in greenhouses.

The energy crisis which set in at the end of 1973, resulting in heavy rises in prices of fuel oils, has caused considerable economical problems, particularly to market gardens, with regard to the heating of greenhouses. Hitherto it has not been possible in an economically defensible manner to insulate greenhouses, the walls and roof of which normally consist of a single layer of glass, as previously proposed solutions of the problem have either been expensive structures or solutions demanding hard work by installation and removal of the insulating materials. It has furthermore been connected with great inconvenience to store the insulating materials when not in use.

The object of the present invention is to provide a thermal insulating curtain, which is cheap in production, easy to remove and which only occupies very little space in a packed condition for storage.

This is achieved by the thermal insulating curtain according to the invention characterized by pieces of tube foil connected to a whole along diametrically opposite axially extending surface parts.

In its installed state such a curtain forms two parallel surfaces with essentially still or dead air between them, as the connected parts of the tube foils prevent upwards- and downwards flowing air currents, so that the curtain gets a marked thermal insulating effect.

The curtain according to the invention will work as a closed Venetian blind with the parts of the pieces of tube foil connected to a whole as lamellas and the curtain similar to the Venetian blind possesses the advantage that it takes up very little space in its folded up condition. The curtain according to the invention can thus be mounted stationary in a greenhouse and be drawn or pulled up as required by means of a cord drive.

In a preferred embodiment of the curtain according to the invention at least part of the circumference of the pieces of tube foil is impermeable and/or reflective as to rays.

In addition to the curtain being in itself thermal insulating there also is achieved that the parts of the circumference of the pieces of tube foil being impermeable and/or reflective as to rays will further increase the insulating power, as the radiating heat is hindered by or reflected from the curtain.

According to the invention the pieces of tube foil may be of translucent material and can be provided with one or several axially extending coatings which are impermeable and/or reflecting relative to rays. Hereby there is achieved that the curtain can be manufactured from common plastics as tube foil which in a suitable manner can be provided with one or several coatings.

The coatings can be limited to that part of the circumference of the pieces of tube foil which is connected with the adjoining pieces of foil, whereby a true Venetian blind effect is achieved, as the surfaces connected to a whole and with them the coatings can be given different inclinations.

In a preferred embodiment of the invention the coatings on each piece of tube foil extend from the parts connected with the adjoining pieces of tube foil to near the natural fold of the piece of tube foil. Hereby there is achieved an almost unbroken surface that is impermeable and/or reflective as to rays material at the same time as the folding up of the curtain is not prevented since the fold of the pieces of tube foil is held free. In this embodiment it is suitable that there are only coatings on one side of the curtain, since that side in this case faces the heated room.

Figure 2:
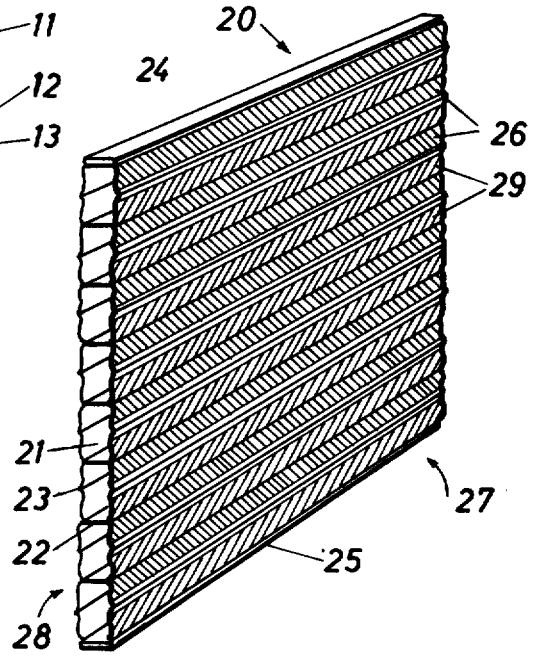
Figure 3:
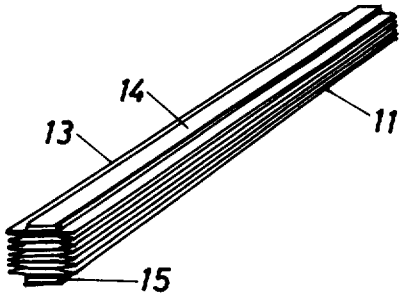
Figure 4:
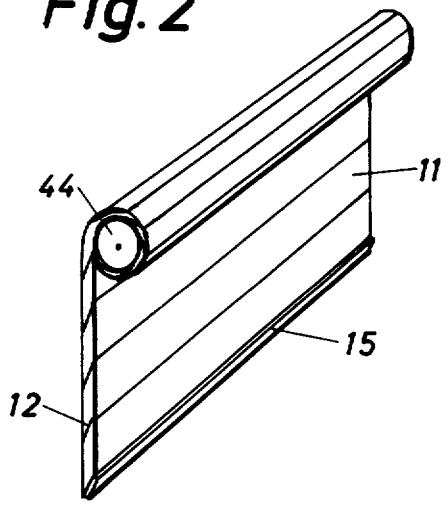

The invention will now be described in detail below by means of some examples of embodiments with reference to the drawings as follows:

FIG. 1 illustrates a perspective view of a thermal insulating curtain according to the invention, FIG. 2 is another embodiment of the curtain according to the invention, FIG. 3 shows the curtain in FIG. 1 or 2 of folded up condition and FIG. 4 shows the curtain wound up on a stick or on a roller.

The thermal insulating curtain 10 in FIG. 1 consists of pieces of tube foil 11. These pieces of tube foil may be manufactured from plastic tube foil, which is available in flat lengths. By pasting the pieces together in a certain width in the middle of the length there is obtained a curtain, which in a stretched condition has transverse connection to whole parts 12 and in which the folds 13 of the tube foil length are situated in the middle between the connected parts 12. The curtain at the top thereof is provided with an upper or carrying fillet 14 and at foot or base thereof is provided with an lower fillet 15, and the width of these fillets corresponds to the width of the connection to whole parts 12.

In this embodiment of the curtain according to the invention the pieces of tube foil 11 are impermeable and/or reflective as to rays by way of coatings 16, which are limited to the parts connected with the adjoining pieces of foil. If the pieces of tube foil are transparent or translucent, the curtain gets the character of a Venetian blind, in which the coatings 16 form the lamellas. The inclination of the coatings may be varied by means of the carrying fillet 14 being turned about its longitudinal axis.

The front 17 and the back 18 of the curtan thus form or define parallel surfaces with essentially still or dead air between them, since circulation of the air in vertical direction is prevented by the connection to whole parts 12 or the coatings 16.

In FIG. 2 there is shown another embodiment 20 of the curtain according to the invention. This consists of pieces of tube foil 21 with connection to whole parts 22 and with the natural fold 23 of the tube foils located in the middle between the connected parts. The curtain has an upper fillet 24 and a lower filled 25, which also here are of essentially the same width as the connected parts 22. The pieces of tube foil here have coatings 26 and 29 extending from the connected parts 22 to near the fold 23 of the tube foils. Hereby there is achieved an almost unbroken surface of heat reflecting material, so that the curtain besides the thermal insulating hollow space between the front 27 and the back 28 also repels the heat rays coming from inside the room. This assures that the curtain in itself will not be essentially heated, whereby condensation of water vapor in the space between the curtain 20 and the glass wall with resulting formation of ice, if any, on the panes is avoided to a great extent. It is only necessary to provide the front 27 with coatings, i.e., the side facing the heated room.

One of the advantages of the curtain according to the invention is that it does not take up much space in removed or folded up state. In FIG. 3 there is illustrated how the curtain similar to a Venetian blind is folded up along the folds 13 of the pieces of tube foil 11. Between the upper and lower fillets 14 and 15 there is located an unillustrated cord drive extending through holes in the fillets and the pieces of tube foil.

It is also possible to pull up the curtain in a manner similar to a common blind. As shown in FIG. 4, one can attach the curtain to a round stick or roller 44 instead of to the upper fillet 14, so that the curtain on turning about the round stick 44 is wound up on same.

The invention is not limited to curtains with coatings such as shown in the drawing. The curtain may e.g., be manufactured from black tube foil, by means of which the whole curtain will be impermeable to rays.

The curtain according to the invention may naturally also be used in other places than in greenhouses. The curtain 10 in FIG. 1 if the pieces of tube foil are made from clear plastics can be used as a thermal insulating curtain in front of windows in other localities, just as the curtain can also be used with vertically oriented pieces of tube foil 11, as e.g., the embodiment in FIGS. 1 to 3, the upper and lower fillets 14, 15 may be moved in rails or by means of cords or rods passing through the pieces of tube foil.

In this connection it should also be mentioned that the curtains must not necessarily be located vertically, they may just as well be located obliquely along the roof of a greenhouse or even horizontally as an insulating ceiling.

It is, of course, to be understood that the present invention is by no means limited to the specific showing in the drawing, but also comprises any modifications within the scope of the appended claims.

What I claim is:

1. A heat insulating collapsible curtain comprising a plurality of parallel tubular members of plastic foil having adjoining sides bonded together to form lamellae along the bonded areas, the sides of the members extending in parallel planes connected by said lamellae, so as to form a curtain with spaced walls, a rigid member fastened along [the upper and lower surfaces the] *a surface of at least one of said* top and bottom tubular members, [respectively,] said *at least one* rigid [members] *member* being angularly adjustable to move the spaced walls of said curtain in their respective planes and move the lamellae angularly relatively to said walls, each of said tubular members having creases along opposite sides to form folding lines for flattening the tubular member, so that said curtain may be collapsed by flattening all said tubular members, thereby forming a stack of such flattened members.

2. A curtain formed by a stack of superimposed flat plastic tube foils, with flat end strips of less width than said tube foils secured to the upper and lower surfaces of the top and bottom foils, respectively, the adjoining surfaces of said foils having a width substantially equal to the width of said flat end strips *and being* bonded together with coatings to provide flat lamellae, said lamellae of the tube foils being connected by the sides of said tube foils [with the crease] *which foils define therein creases* along opposite sides of said foils flexing to allow the sides to assume position in planes perpendicular to the planes of said lamellae to expand the curtain between said end strips, said lamellae suspended from said end strips at the same angle as said end strips.

3. A heat insulating curtain in combination according to claim 2, in which at least portions of said tubular members are heat impermeable.

4. A heat insulating curtain in combination according to claim 2, in which at least portions of said tubular members are heat reflecting.

5. A heat insulating curtain in combination according to claim 2, in which sections of said tubular members are translucent.

6. A heat insulating curtain in combination according to claim 2, in which at least a section of each of said tubular members is provided with a heat impermeable coat.

7. A heat insulating curtain in combination according to claim 2, in which at least a section of each of said tubular members is provided with a heat rays reflecting coat.

8. A heat insulating curtain in combination according to claim 2, in which said common slat-like lamellae are heat reflecting.

9. A heat insulating curtain in combination according to claim 2, in which only one side of said curtain is provided with a heat reflecting coat.

*10. A heat insulating collapsible curtain comprising:*

*a stack of superimposed, inperforate, tubular foils,*

*said foils being bonded together along their adjoining sides over a band whose width substantially equals the curtain thickness to provide thereby in the expanded state of the curtain a pair of opposed, parallel spaced imperforate sidewalls and a plurality of spaced transverse walls interconnecting the sidewalls, with each of said transverse walls formed of the bonded sides of the adjoining tubular foils,*

*each of said tubular foils being longitudinally creased at substantially the midpoint between the successive ones of said spaced transverse walls to permit thereby the collapsing of said curtain in accordian-like fashion,*

*whereby said curtain in its expanded state comprises a plurality of parallel, adjoining, tubular air spaces situated between said parallel sidewalls and in its collapsed state folds into a highly compact assemblage.*

* * * * *